United States Patent
Diloisy

(10) Patent No.: US 7,266,355 B2
(45) Date of Patent: Sep. 4, 2007

(54) LOW COMPLEXITY EQUALIZER FOR RADIO RECEIVER

(75) Inventor: Romain Diloisy, Asnieres sur Seine (FR)

(73) Assignee: NXP B.V., Eindhoven (NL)

( * ) Notice: Subject to any disclaimer, the term of this patent is extended or adjusted under 35 U.S.C. 154(b) by 50 days.

(21) Appl. No.: 10/536,222

(22) PCT Filed: Nov. 14, 2003

(86) PCT No.: PCT/IB03/05207

§ 371 (c)(1),
(2), (4) Date: May 24, 2005

(87) PCT Pub. No.: WO2004/049595

PCT Pub. Date: Jun. 10, 2004

(65) Prior Publication Data

US 2006/0234662 A1    Oct. 19, 2006

(30) Foreign Application Priority Data

Nov. 27, 2002 (GB) ................................ 0227626.9

(51) Int. Cl.
*H04B 7/00* (2006.01)
(52) U.S. Cl. .................. 455/273; 455/504; 455/506; 455/63.1; 455/114.2; 375/230; 375/232
(58) Field of Classification Search ............... 455/273, 455/424, 425, 426.1, 452.2, 456.5, 456.6, 455/550.1, 561, 455, 501, 504, 505, 506, 455/63.1, 67.11, 65, 134, 135, 272, 278.1, 455/296, 333, 132; 342/380, 383, 423; 375/232, 375/229, 230, 233, 231, 349, 136, 144, 147, 375/340; 370/342, 335, 206, 508, 519, 334, 370/336, 337, 345, 347, 458
See application file for complete search history.

(56) References Cited

U.S. PATENT DOCUMENTS

| 4,384,358 | A | * | 5/1983 | Shiki et al. .................. 375/347 |
| 5,379,324 | A | * | 1/1995 | Mueller et al. .............. 375/340 |
| 5,644,597 | A | * | 7/1997 | Ueda ........................... 375/232 |
| 5,838,742 | A | * | 11/1998 | Abu-Dayya .................. 375/347 |
| 5,901,075 | A | * | 5/1999 | Offord et al. ................ 708/322 |
| 5,907,303 | A | * | 5/1999 | Yukitomo et al. ........... 342/380 |
| 5,940,454 | A | * | 8/1999 | McNicol et al. ............. 375/347 |
| 6,647,015 | B2 | * | 11/2003 | Malkemes et al. ........... 370/401 |

(Continued)

FOREIGN PATENT DOCUMENTS

GB    EP 0430481 A2 *   6/1991

*Primary Examiner*—Edward F. Urban
*Assistant Examiner*—Charles Chow

(57) ABSTRACT

A diversity receiver (60) has two diverse channels fed by the antennas, an adaptive equalizer (20,30) for each channel and a coefficient adapter (40) for adapting two sets of coefficients in a time shared manner for the equalizers. A combiner combines the equalized signals. By sharing one adapter for adapting the coefficients between two or more equalizers, the calculation load can be reduced. This is useful for small mobile terminals powered by battery, for use with GSM or UMTS or other radio networks. It can be applied to any type of equalizer, and using any manner of time sharing. The combiner can exploit any type of diversity between the equalized signals. The equalizers can output two equalized signal values in consecutive time slots, by reusing the same coefficients, while new coefficients are being calculated.

10 Claims, 3 Drawing Sheets

U.S. PATENT DOCUMENTS 6,745,052 B2 * 6/2004 Corbaton et al. ........ 455/562.1
7,082,174 B1 * 7/2006 Smee et al. ................ 375/349
2001/0004390 A1 * 6/2001 Pukkila et al. ............. 375/340
2004/0041652 A1 * 3/2004 Takahashi ................ 333/28 R
2004/0198452 A1 * 10/2004 Roy ........................ 455/562.1

* cited by examiner

LOW COMPLEXITY EQUALIZER FOR RADIO RECEIVER

FIELD OF THE INVENTION

The invention relates to diversity receivers, to mobile terminals having such receivers, and to methods of offering communications services using such terminals.

BACKGROUND

Radio communication systems often suffer from the effects of multipath propagation also known as multipath fading, whereby a transmitted signal reaches a receiver via a plurality of distinct paths from the transmitter owing to the transmitted signal being scattered and reflected by numerous physical objects. In mobile communication systems, the different paths and their relative signal strengths will change rapidly if the mobile terminal is moving. The receiver receives a superposition of these signals on the different paths, which can add up constructively or destructively, causing variations in the received signal amplitude. If the mobile moves over a distance of the order of half a wavelength (which is 7.5 cm for 1,8 GHz) the interference may change from destructive to constructive or vice versa. A receiver moving at high speed can pass through several fades in a small period. In a bad case, a receiver may stop receiving altogether at a particular location at which the received signal is in a deep fade. Maintaining good communications can then become very difficult. To address this, the use of various diversity techniques (such as antenna diversity, polarisation diversity, time diversity and others) is known to mitigate the negative effect of channel fading. Diversity methods used in current mobile communications system are frequency and time diversity whereas space and polarisation diversity are not used (at least in receivers for mobiles) because of limitations on size, power consumption and processing capacity. In antenna diversity, two or more receiving antennas are provided for a receiver. Provided the antennas are sufficiently separated so that the signals received at one antenna are substantially uncorrelated with those received by another, when one antenna is in a null, another antenna is likely to be able to receive a good signal.

The Rake receiver is one known way of improving reception performance by collecting signal energy of resolvable multipath interference received on one antenna. However, to have a multipath gain the time delay difference between two paths must be larger than a chip's period (about 270 ns, where chip is defined as part of a spreading code used for CDMA coding). This condition is true in some environments (typically outdoor environment), in other environments of type such as indoor or pedestrian (i.e. Base Station outdoor and mobile indoor), the multipath gain is low and the rake performance rapidly degrades. To improve the performance, it is known to use a dual antenna receiver to exploit space diversity.

The number of multipaths resolvable with a rake receiver is:

$$L = \lfloor \tau/T_c \rfloor + 1$$

where L is the number of multipath paths, $\tau$ is the delay spread, $T_c$ is the chip duration. When $\tau > T_c$ (indoors or factory) the multipath diversity is null and the performance degrades rapidly. Simulations have been done in outdoor and indoor environment and show the influence on Rake performance. To resolve this problem, diversity is used but to improve the performance it is necessary to have uncorrelated fading on each antenna. The correlation coefficient decreases as the antenna separation increases.

In a UMTS downlink the signals are transmitted in a synchronous manner, so the spreading codes are perfectly orthogonal at the base station. However, orthogonality of spreading sequences is degraded or destroyed by the different delays caused by multipath propagation resulting in multiple access interference MAI at the output coherent rake receiver. This effect is due to the suboptimal treatment of the MAI as an uncorrelated noise by the rake receiver.

In situation where a small number of users are active ($N_{user}/SF \leq 0.25$), the classical Rake receiver performs in an adequate manner and more signal processing may be unnecessary (assuming high spreading factors 256 or 128). However as the number of users increases to a value approaching the spreading factor, it can have a catastrophic effect on performance even in perfect power control conditions. An interference rejection technique can be used in this case.

PCT patent application WO 0113530 shows an example of applying a Rake receiver to a CDMA system. In this case, a signal received from all L antenna branches is brought via radio frequency parts to a delay estimator connected to the antenna branch. In the delay estimator, the delays of the best audible multipath propagated signal components are searched for. A Rake finger is allocated for processing the found multipath propagated signal components. The delay estimator informs each Rake branch of the delay found. The delay estimator comprises a matched filter for each antenna branch Thus the number of matched filters is also L. In the matched filter a predetermined number of parallel correlation calculations are performed for the received radio signal by different delays in order to estimate the delays of the multipath propagated signal components. In correlation calculation, the spread pilot part contained in the received radio signal is despread by a known spreading code using a predetermined delay.

On the basis of the calculated correlations, an allocator situated in the delay estimator selects at least one delay, by which a multipath propagated signal component is received. The allocator allocates a Rake finger for processing the signal component found by informing the Rake finger of the delay found. To perform the selection, the correlation results of each matched filter are typically combined in the allocator. If the correlation is high, a delay is found that represents the delay of the multipath propagated signal component of the radio signal coming to the antenna branch in question.

This considerably increases the complexity in all situations and so is not practical for a mobile station for which low computational load, low power consumption and low cost are needed.

SUMMARY OF THE INVENTION

It is an object of the invention to provide improved apparatus or methods, addressing such problems. According to a first aspect of the invention, there is provided a receiver for use with one or more antennas, the receiver having:

two or more diverse channels fed by the antenna or antennas, two or more adaptive equalizers, each for equalizing a signal of one of the channels, each equalizer having a set of coefficients, and a coefficient adapter for adapting two or more of the sets of coefficients in a time shared manner, and a combiner for combining the equalized signals.

By sharing one adapter for adapting the coefficients between two or more equalizers, the calculation load can be reduced. This is particularly useful for small mobile terminals powered by battery. It can be applied to any type of equalizer, and using any manner of time sharing. The combiner can exploit any type of diversity between the equalized signals, and can be used with any type of radio modulation. It is based on a recognition that the primary type of interference addressed, multiple access interference, changes sufficiently slowly that it is not necessary to update the coefficients as frequently as the sample time for updating the output of the equalizer. It can give improved performance relative to known rake receivers in terms of better interference rejection (leading to increased network capacity) with good fading effect attenuation owing to the combining of (leading to improved efficiency for the network). These can be achieved with lower computational complexity compared to 2D-rake receivers, which means lower power consumption, which is of course particularly important for receivers in small mobile terminals.

An additional feature of some embodiments is the equalizers being arranged to output two or more equalized signal values in consecutive time slots, by reusing the same coefficients, while new coefficients are being calculated for a different one of the equalizers in each of the consecutive time slots. This arrangement helps make the most use of the simpler arrangement of the adapter.

An additional feature of some embodiments is the coefficient adapter being arranged to use the same algorithm for adapting the coefficients for each of the equalizers. Again this helps keep the adapter simpler and so easier and cheaper to implement.

An additional feature of some embodiments is the adapter being arranged to use a linear algorithm. These tend to be simpler than non linear alternatives, and so easier and cheaper to implement.

An additional feature of some embodiments is the adapter having an input of feedback from the combined equalized signal. This helps provide more direct feedback to enable the adaptation to converge more rapidly or accurately than other alternatives.

An additional feature of some embodiments is the adapter being arranged to use the signal to be equalized and an estimated wireless path characteristic to adapt the coefficients. This is one of a number of alternative possibilities, it has advantages of better adaptation because the coefficient is more directly related to the channel characteristic, which is particularly useful when the terminal moves, and the path characteristic changes rapidly.

An additional feature of some embodiments is circuitry for demodulating and CDMA decoding of the combined equalized signal. This is one of the more widely used and commercially valuable modulation schemes, and one that is particularly susceptible to MPI and MAI, so the benefits of the various features set out above are more relevant to this scheme.

An additional feature of some embodiments is circuitry for IF processing of the signals from the antennas. This is a convenient way of preparing the signals for equalization.

An additional feature of some embodiments is circuitry for converting the signals from the antennas into complex digital form before equalization. This is a particularly convenient format of signal on which to carry out the equalization, as it maintains phase information in the signal.

An additional feature of some embodiments is the receiver being implemented as one or more integrated circuits. This can provide enhanced processing speed compared to software implementations, and by integrating more parts, manufacturing costs can often be lowered.

Another aspect of the invention provides a mobile terminal having an antenna, the receiver set out above, coupled to the antenna, and a processor coupled to the receiver for processing data received by the receiver. This is claimed explicitly as the advantages can feed through to enable better terminals, with much greater added value than the value of the receiver component alone.

Another aspect of the invention provides a method of offering a communication service using the terminal. This is claimed explicitly again as the advantages of the terminals can enable correspondingly improved services, with much greater added value than the value of the receiver component alone.

Any of the additional features can be combined together or with any of the aspects of the invention, as would be apparent to those skilled in the art. Other advantages may be apparent to those skilled in the art, especially over other prior art not known to the inventors.

BRIEF DESCRIPTION OF THE DRAWINGS

Embodiments of the invention will now be described by way of example, and with reference to the accompanying drawings, in which.

DETAILED DESCRIPTION

Figure 1:
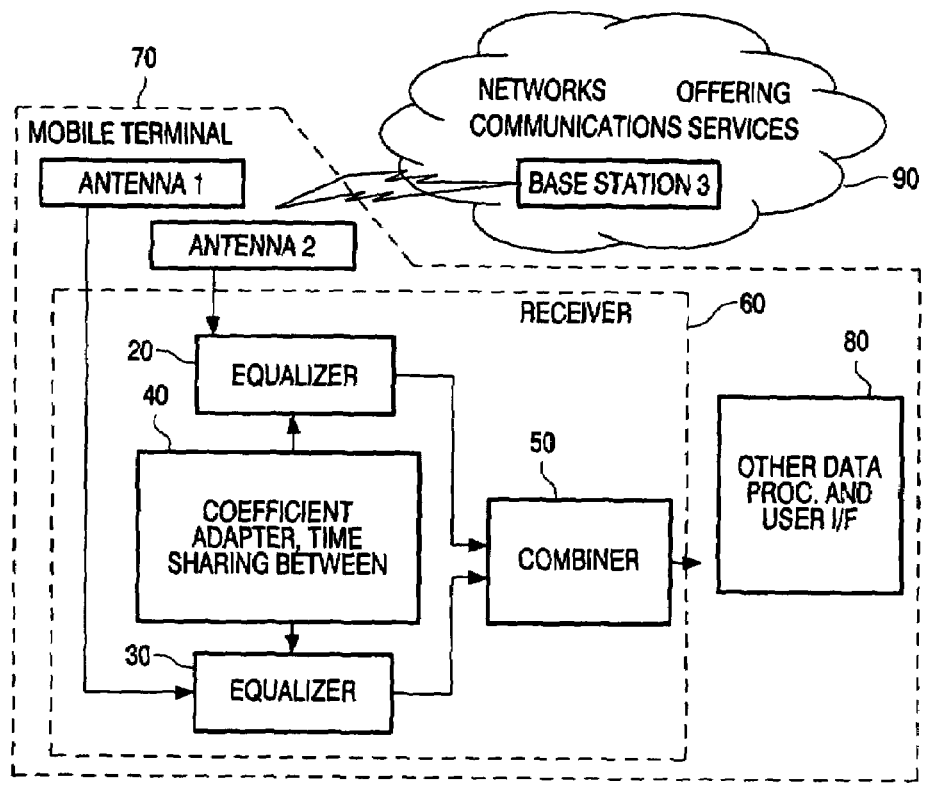
FIG. 1 shows an embodiment of a receiver in a terminal coupled to a network.

FIG. 1. Embodiment of a Receiver Coupled to Network.

FIG. 1 shows an embodiment of a receiver 60 coupled by a wireless link to a base station 3 of a network or networks 90. One particular application is for receiving data related to communications services offered by an operator over the network, such as voice services or information services for example. The receiver in this example is incorporated in a mobile terminal 70, though in principle it could be applied in a base station. The mobile terminal includes a pair of antennas 1,2, spaced and coupled to benefit from spatially diverse reception. Channel signals from the antennas feed the equalizers. In principle, the channel signals can be fed from a single antenna and exploit other types of diversity such as time or polarization for example. There can be more than two antennas and/or more than two channels. Other parts of the mobile terminal such as user interface, data or voice processing functions and so on are represented by part 80. The receiver can be applied in any type of terminal, using any kind of modulation type and any air interface standard.

The receiver includes first and second equalizers 20, 30, whose outputs are combined by combiner 50, and fed to other parts for further processing of the equalized signal. The equalization is for the purpose of reducing MPI or MAI. The equalizers can be any type which is adaptive, such as linear types including transversal filters, decision feedback equalizers, or non linear types including maximum likelihood sequence estimators MLSEs. They operate using coefficients (called probability distribution functions for MLSEs) which can be adapted, to adapt the equalization. A large proportion of the computational load is usually taken up by calculating the updated coefficients. The coefficient adapter 40 is shared between the equalizers. This time sharing of the adapter, can achieve the benefits set out above. An example of how this is arranged is shown in FIG. 2.

Figure 2:
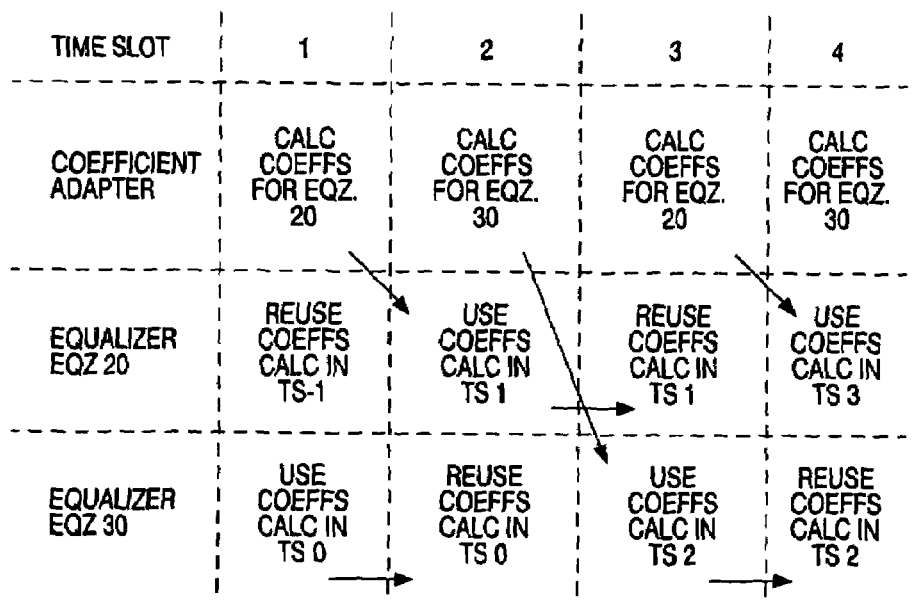
FIG. 2 shows operations of the equalizer and coefficient adapter in a sequence of time slots.

FIG. 2. Operations of the Equalizer and Coefficient Adapter in a Sequence of Time Slots FIG. 2 shows a sequence of time slots and the operations of the equalizers and coefficient adapter in each slot. This can be the operations of the equalizers and adapter of FIG. 1 or of other equalizers and adapters. The first row shows headings indicating the number of the time slot. The second row indicates the actions of the coefficient adapter. The third and fourth rows show the actions of the equalizers. In time slots 1 and 3, the adapter calculates coefficients for first equalizer EQZ 20. In time slots 2 and 4, the adapter calculates coefficients for second equalizer EQZ 30. In time slot 2 the first equalizer uses the coefficients calculated in time slot 1. In time slot 3, it reuses the same coefficients on new inputs from its antenna. In time slot 4, it uses the new coefficients calculated for it in time slot 3, and so on. Meanwhile, correspondingly, the second equalizer EQZ 30 uses in time slot 3 the coefficients calculated for it in time slot 2. In time slot 4 it reuses the same coefficients on new inputs from its antenna, and in time slot 5, (not shown), it would use new coefficients calculated in time slot 4 and so on.

Figure 3:
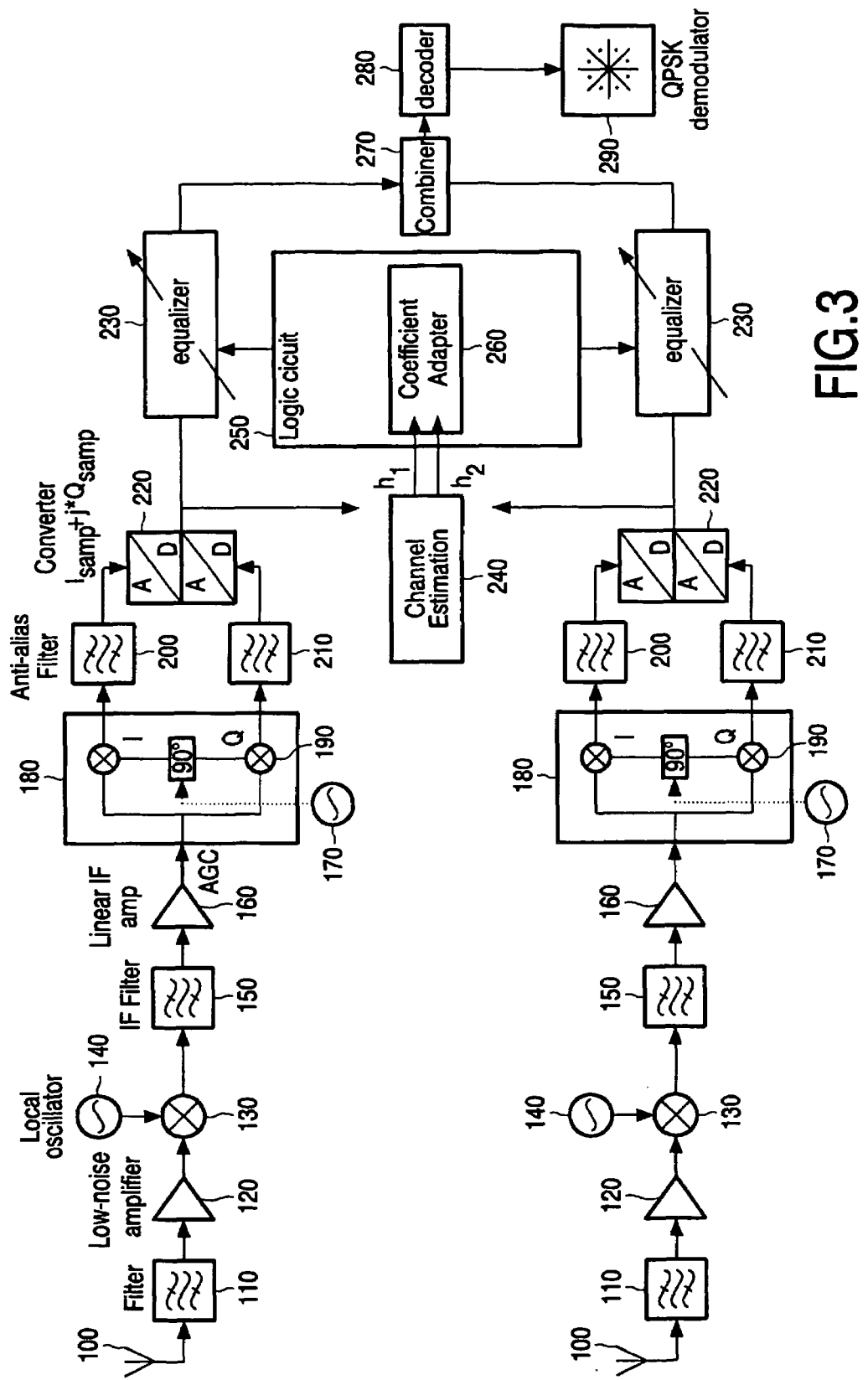
FIG. 3 shows an example of a receiver and antenna.

FIG. 3. Embodiment of a Receiver

A block schematic diagram of an embodiment of a receiver is shown in FIG. 3. The receiver can be an example of the receiver of FIG. 1 or other receivers. Radio Frequency (RF) signals are received by antennas 100, and the signal from each antenna is passed through chain of processing elements, essentially the same for each antenna. The chain includes antenna filter 120, and Low Noise Amplifier (LNA) 120. At this stage the RF signals are contain a first frequency band which contains a wanted signal, while second and third frequency bands contain unwanted adjacent channel signals.

The outputs of the LNAs are connected to IF mixer 130 which is fed by local oscillator 140. The output of the mixer is fed via an IF filter 150. A linear IF amplifier stage 160 with automatic gain control then feeds a pair of quadrature mixers, 180, and 190, to produce in phase and quadrature IF signals respectively. A second local oscillator 170 feeds these quadrature mixers. The quadrature signals are filtered by anti alias band pass filters 200, 210, and the outputs are fed to analog to digital convertors 220 to produce complex digital signals for equalization. These can be multi level or single-bit Analogue-to-Digital Converters (ADC) with limiters to remove amplitude information prior to the inputs to the ADCs.

The complex digital signals are then subject to equalization by equalizer 230 weighted by adapted coefficients and combined in combiner 270 with corresponding signals from one or more other antennas. The combiner can be in the form of a simple switch for selecting the better signal, or in the form of an adder, or a weighted combination reflecting the respective signal to noise ratios of the signals. Then they are passed to Baseband processing elements where they are decoded by decode 280 and demodulated by QPSK demodulator 290. The effects of spectrum folding in the IF stages can be removed by the baseband processing by use of the I and Q channels.

The coefficients for the equalizer are adapted by logic circuit 250 which includes equalizer coefficient adaptation algorithm 260, which has as inputs the preceding coefficients, an output error signal for feedback, and a value representing an estimated impulse response of the channel, derived from the inputs from the antenna by a channel estimation part 240. Another input to the algorithm is optionally a feedback signal from the receiver output after decoding and demodulation.

Figure 4:
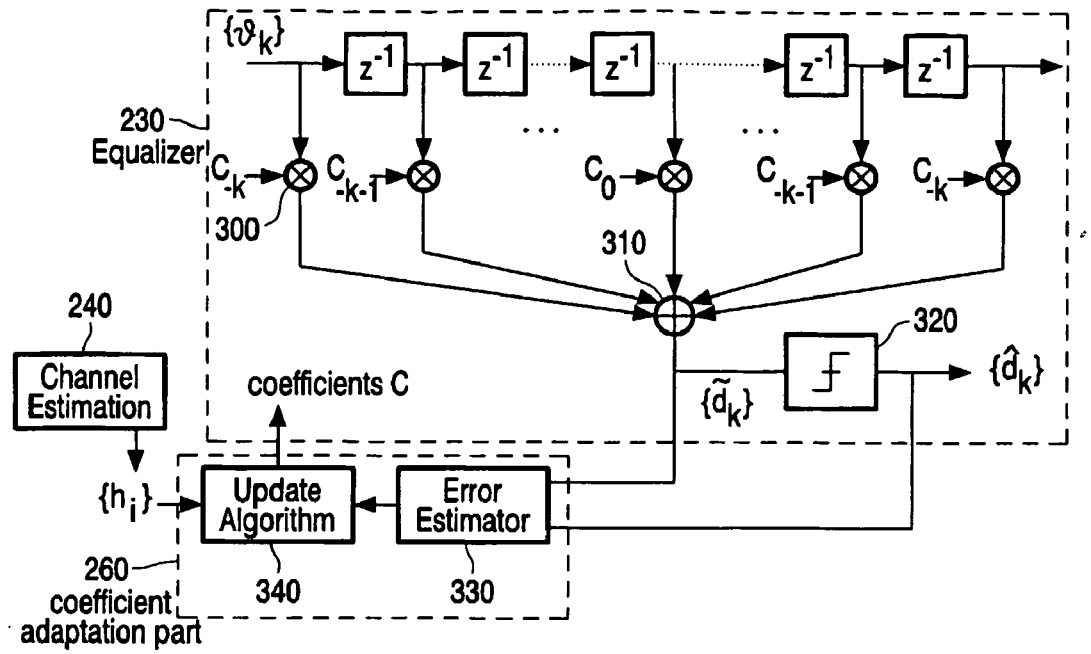
FIG. 4 shows an example of an adaptive algorithm for use in FIG. 3

FIG. 4, Equalization Using Linear Coefficient Adaptation Algorithms

The linear equalisation of the channel can be realised in using a linear transversal filter. An example of the overall structure is shown in FIG. 4. It comprises the equalizer 230 having a weighting part made up of a series of delay elements z, a series of coefficient multipliers 300, an adder 310, and a threshold element 320. The part 260 for the adaptation of coefficients is made up of an error estimator 330, and an update algorithm 340, and uses the output of the channel estimation part 240. The input of the equalizer is formed by the sample $\{\theta_k\}$ coming from the output of the ADC. The output of the linear equalizer is a sequence $\{\tilde{d}_k\}$ which represent an estimation of the symbol $\{d_k\}$. The number of taps $C_k$ with k=-K ... K is 2K+1. The equalizer is defined by:

$$F(z) = \sum_{k=-K}^{K} C_k z^{-k}$$

The threshold detector allows determining the symbol $\{d_k\}$ from the sample $\{\tilde{d}_k\}$. Without error, we should have $\{\tilde{d}_k = d_k\}$, the signal error is define by $\{e_k = \tilde{d}_k - d_k\}$. The samples $\{\tilde{d}_k\}$ are obtained from the following expression $$\tilde{d}_k = \sum_{j=-K}^{K} C_j \theta_{k-j}$$

This is what is carried out by the weighting part. An optimisation criterion commonly used in digital communications is the minimisation of the error probability. Unfortunately the error probability is a non-linear function of the coefficients. So a direct implementation of this is in practice usually too difficult or computationally intensive to resolve. To bypass this problem other criteria can be used. A first type of equalizer is called Zero-Forcing equalizer based on peak distortion criteria. A second type is based on minimisation of mean square error $E\{|e(k)|^2\}$ and is called a Minimum Mean Square Error equalizer.

Other techniques based on non linear equalisation can be used as an alternative, and will be described below with reference to FIG. 5.

Zero-Forcing involves adapting by applying the criterion of minimisation of the peak distortion. Firstly, considering an infinite number of coefficients, that theoretically enable complete removal of the interference, the global impulse response in z transform is given by:

$$Q(z) = F(z) \cdot \Theta(z) \quad \text{Equation 1-1}$$

where $\Theta(z)$ is the z transform of the impulse response of the channel

F(z) is the z transform of the impulse response of equalizer

The interference is completely removed when Q(z)=1, so if this relation is introduced in Equation 1-1, then:

$$\Theta(z) = \frac{1}{F(z)} \quad \text{Equation 1-2}$$

The zero forcing equalizer cancels interference by inverse filtering of the channel F(z). Any attenuation generated by the channel can be compensated by an amplification in the equalizer. The finite-length ZF equalizer has 2K+1 coefficients, which are obtained by resolution of the following linear system:

$$\sum_{j=-K}^{K} C_j \vartheta_{k-j} = \delta_0^j \quad \text{Equation 1-3}$$

Zero Forcing Equalizer adaptation involves adding at each coefficient $C_j^n$ a correction $dC_j^n$ where n represents the iteration. The coefficients are obtained by:

$$C_j^{n+1} = C_j^n + dC_j^n \text{ with } j = -K \ldots K$$

This method is the basis for all such adaptive equalizers. To find the correction which best adjusts the coefficients of the equalizer, the lack of correlation between the error signal and the symbol is exploited and it is assumed that the symbols are uncorrelated with each other.

In this case forcing the sample of the channel to zero is equivalent to cancelling $E[e_n \cdot d_{n-j}^*]$. So the desired coefficients can be determine by the expression $C_j^{n+1} = C_j^n + \mu e_n d_{n-j}^*$ where $\mu$ is a range factor that lies between 0 and 1.

An MMSE equalizer operates to minimize the quadratic error and is defined by $$\epsilon = E\{|d_n - \tilde{d}_n|^2\} \quad \text{Equation 1-4}$$

The output of the equalizer is given by $$\tilde{d}_k = \sum_{j=-K}^{K} C_j \vartheta_{k-j}.$$

If the previous relation is introduced in Equation 1-4, this gives:

$$\varepsilon_k = E\left\{\left|d_n - \sum_{j=-K}^{K} C_j \vartheta_{k-j}\right|^2\right\} \quad \text{Equation 1-5}$$

The minimization of the Equation 1-5 with respect to the coefficient is equivalent to forcing the error to be orthogonal to the signal sample $\theta_{k-j}$, which gives $E\{\epsilon_k \theta_{k-1}^*\} = 0$ where $\epsilon_k$ can be replaced by $$d_n - \tilde{d}_n = d_n - \sum_{j=-K}^{K} C_j \vartheta_{k-j}.$$

Finally this leads to $$\sum_{j=-K}^{K} C_j E\{|\vartheta_{k-j}\vartheta_{k-i}^*|^2\} = E\{d_k \vartheta_{k-i}^*\}$$

where $E\{|\theta_{k-j}\theta_{k-1}|^2\} = \Gamma = [\gamma_{j1}]$ and $E\{d_k \theta_{k-1}^*\} = A = [a_1]$.

The linear system can be expressed as matrix form, as:

$$\Gamma C_{opt} = A \Rightarrow C_{opt} = \Gamma^{-1} A$$

The determination of coefficient for the MMSE equalizer requires computing of the inverse of the [2K+1]×[2K+1] matrix $\Gamma$. As this is usually too computationally intensive to be practical, the LMS algorithm is often used. This algorithm is an adaptive algorithm where $C_j^n$ is obtained by:

$$C_j^{n+1} = C_j^n - \Delta G_n$$

The gradient is given by $G_n = -E[\epsilon_n \theta_n]$ which gives:

$$C_j^{n+1} = C_j^n + \mu E[\epsilon_n \theta_n]$$

In practice the gradient must be estimated by $\hat{G}_n = -\epsilon_n \theta_n$ and $C_j^{n+1} = C_j^n + \epsilon_n \theta_n$ with $C_j^0 = 0$.

As discussed above, a single processing part for evaluating the adaptation of the coefficients in this way, can be shared between two or more equalizers. This sharing can be any form of time sharing. A preferred frequency of the time sharing is to switch once each time slot, which is 2560 chips and the chip duration is 260 nsec, giving 665 μsec, as defined in the UMTS standard, though in principle, other frequencies of sharing could be used.

Figure 5:
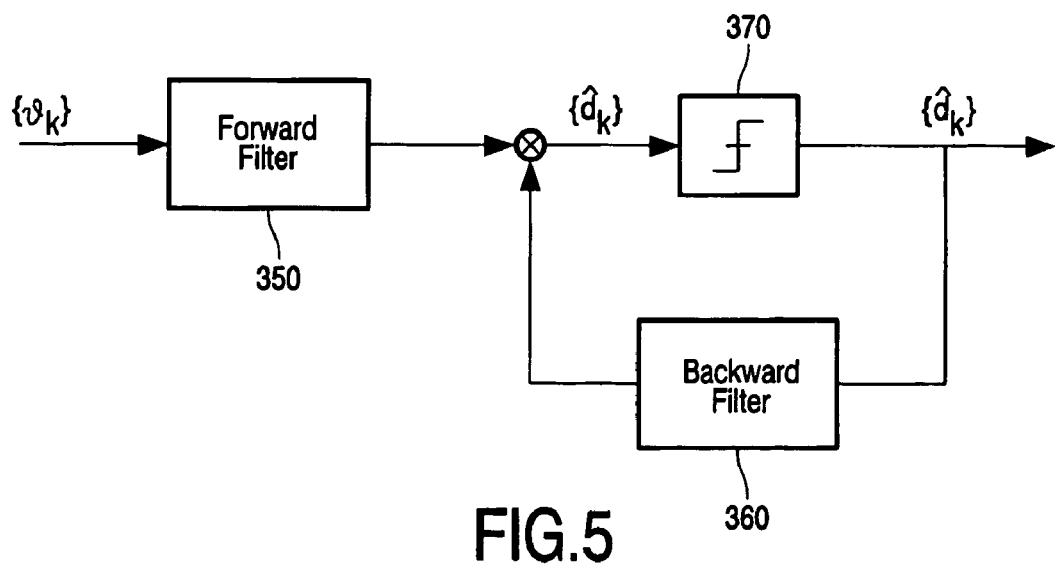
FIG. 5 shows another example of an adaptive algorithm.

FIG. 5 Non-Linear Equalization

The DFE (Decision Feedback Equalizer) is one example of a non linear equalizer as shown in FIG. 5. It is formed of two transversal filters: a forward filter 350 and a backward filter 360, with an adder 380 and a threshold detector $\tilde{d}_k$ 370. The forward filter receives the sample $\theta_k$ coming from the channel. The objective of this filter is to remove the interference generates by the previous symbols. The backward filter receives the symbol after the threshold detector $\tilde{d}_k$. The output of the backward filter is fed back and added to the signal at the input of the threshold detector. The function of this filter is to remove the interference caused by the prior symbols. The output of the equalizer $\tilde{d}_k$ comes from the threshold filter. In spite of the use of two linear equalizers, the presence of the threshold detector makes the DFE non-linear.

The output of the DFE is given by:

$$\tilde{d}_k = \sum_{j=-K}^{0} C_j \vartheta_{k-j} + \sum_{j=1}^{K} C_j \hat{d}_{k-j}$$

The forward filter is formed of K+1 coefficient and the backward filter is formed of K coefficients. The previous criterion can be applied at the DFE, the performance of the DFE is higher than the linear equalizer.

Other examples of adaptive non linear algorithms can be used.

Other Variations and Concluding Remarks:

Embodiments of the invention have been described with reference to a CDMA system, though it will be apparent that it is applicable to any communication systems in which antenna diversity can be employed, for example UMTS (Universal Mobile Telecommunication System), GSM (Global System for Mobile communications), Bluetooth or DECT. The amount of benefit from this spatial diversity arrangement depends somewhat on there being low correlation between the signals from different antennas. The degree of correlation as a function of the antenna separation tends to behave as a Bessel function and experimental results have shown that a separation distance close to 0.25 λ is sufficient to have uncorrelated fading on each antenna. The use of two antennas on a handheld mobile with this amount of separation, corresponding to several centimeters is realistic.

A new architecture for receivers such as W-CDMA receivers has been described. The system exploits space diversity which allows it to mitigate the fast fading and to enhance the performances in some environments such as indoors or more generally in environments where the temporal dispersion is low. When the interference level is high in particular, the receiver uses an adaptive algorithm to remove interference. An underlying step is making the new assumption that the interference (MAI or MPI) is approximately constant over consecutive time-slots. This means it is not necessary to update the coefficients at each time slot. Also, only one algorithm is used for the two antennas. The algorithm allows the receiver to find the coefficients for the first antenna, these coefficients are used for the following slot and during this time the algorithm calculates updated coefficients for the second antenna. This apparatus reduces the computational complexity of the baseband algorithm and so allows implementation of an optimal processing suited to the constraints linked to the mobile station (price, consumption, size, weight and so on). It can be used in a dual-antenna receiver to provide low complexity suitable for a handset. It can use a combining technique to maximise the SINR (signal to noise plus interference ratio). The weight coefficients can be obtained with a standard linear algorithm such as LMS (least mean square error). To reduce the complexity, a single algorithm is used. While the algorithm is determining the coefficients for the first antenna for use in the following slot, at the same time the equalizer for the second antenna is using the coefficients calculated for it in the preceding time slot. So the overall complexity relative to the conventional classical 2D rake is reduced because effectively only one interference cancellation system is used for both antenna.

The implementation can be done in software using conventional languages, that can instantly reconfigure itself to adapt the equalization. Hardware (logical circuits) can be used to switch between the two antenna and even to implement much of the algorithm to find the coefficients. It also needs to be able to keep the weighting coefficients for reuse over two or more time slots and implement algorithms for optimum combining. Several adaptive algorithms (LMS, RLS . . . ) and conventional reconfigurable hardware technologies (FPGA, DSP and so) can be employed following established principles. An advantage of FPGA is the high speed processing and the short rewrite times to reconfigure logic circuits, which can be less than 50 μs.

Fields of application can include any handheld mobile terminal, especially for high data rate reception at low cost, for example GPRS, third generation, and all CDMA systems. More generally, it can be applied to any antenna diversity application, which is a key element for wireless modules for future multimedia systems including wireless phones and wireless LANs.

As has been described above, a diversity receiver has two diverse channels fed by the antennas, an adaptive equalizer for each channel and a coefficient adapter for adapting two sets of coefficients in a time shared manner for the equalizers. A combiner combines the equalized signals. By sharing one adapter for adapting the coefficients between two or more equalizers, the calculation load can be reduced. This is useful for small mobile terminals powered by battery, for use with GSM or UMTS or other radio networks. It can be applied to any type of equalizer, and using any manner of time sharing. The combiner can exploit any type of diversity between the equalized signals. The equalizers can output two or more equalized signal values in consecutive time slots, by reusing the same coefficients, while new coefficients are being calculated for the other equalizer. Other variations and examples within the scope of the claims will be apparent to those skilled in the art.

The invention claimed is:

1. A receiver for use with one or more antennas, the receiver having: two or more diverse channels fed by the antenna or antennas, two or more adaptive equalizers, each for equalizing a signal of one of the channels, each equalizer having a set of coefficients, and a coefficient adapter for adapting two or more of the sets of coefficients in a time shared manner, and a combiner for combining the equalized signals, the equalizers being arranged to output two or more equalized signal values in consecutive time slots, by reusing the same coefficients, while new coefficients are being calculated for a different one of the equalizers in each of the consecutive time slots.

2. The receiver of claim 1, the coefficient adapter being arranged to use the same algorithm for adapting the coefficients for each of the equalizers.

3. The receiver of claim 1, the adapter being arranged to use a linear algorithm.

4. The receiver of claim 1, the adapter having an input of feedback from the combined equalized signal.

5. The receiver of claim 1 the adapter being arranged to use the signal to be equalized and an estimated wireless path characteristic to adapt the coefficients.

6. The receiver of claim 1, having circuitry for demodulating and CDMA decoding of die combined equalized signal.

7. The receiver of claim 1, having circuitry for IF processing of the signals from the antennas.

8. The receiver of claim 1, having circuitry for converting the signals from the antennas into complex digital form before equalization.

9. The receiver of claim 1, implemented as one or more integrated circuits.

10. A mobile terminal having an antenna, the receiver of claim 1 coupled to the antenna, and a processor coupled to the receiver for processing data received by the receiver.

* * * * *